No. 723,582. PATENTED MAR. 24, 1903.
C. P. BYRNES.
WATER COOLED VALVE.
APPLICATION FILED JULY 30, 1902.
NO MODEL. 4 SHEETS—SHEET 1.

WITNESSES
INVENTOR
C. P. Byrnes

No. 723,582. PATENTED MAR. 24, 1903.
C. P. BYRNES.
WATER COOLED VALVE.
APPLICATION FILED JULY 30, 1902.
NO MODEL. 4 SHEETS—SHEET 2.

WITNESSES
INVENTOR

No. 723,582. PATENTED MAR. 24, 1903.
C. P. BYRNES.
WATER COOLED VALVE.
APPLICATION FILED JULY 30, 1902.
NO MODEL. 4 SHEETS—SHEET 3.
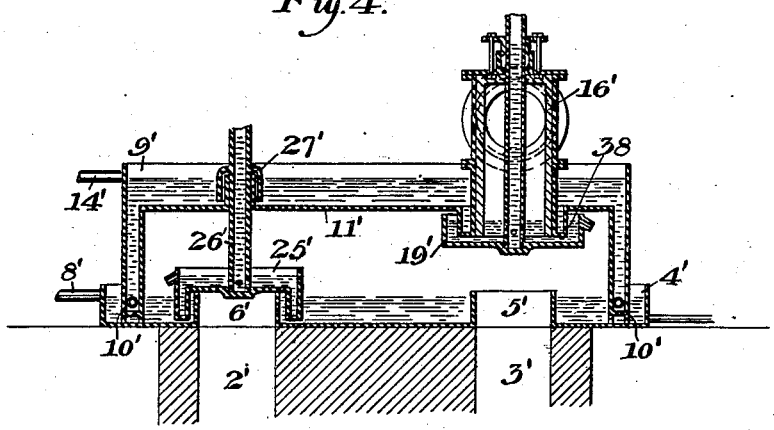
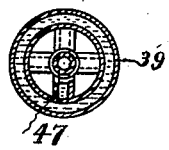
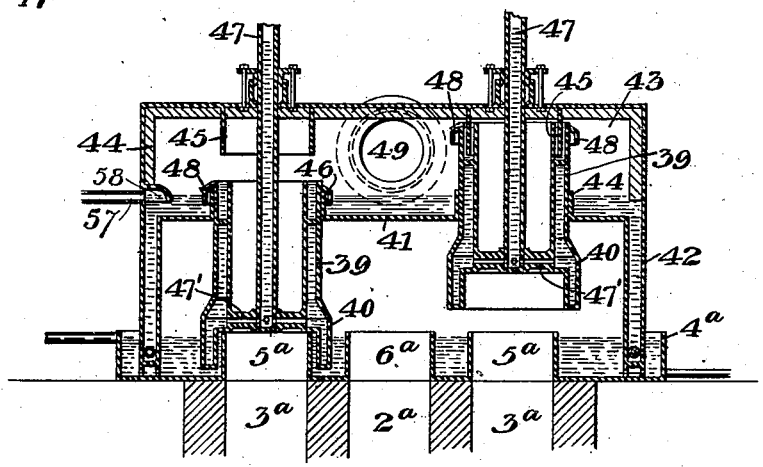
WITNESSES
INVENTOR
C. P. Byrnes No. 723,582. PATENTED MAR. 24, 1903.
C. P. BYRNES.
WATER COOLED VALVE.
APPLICATION FILED JULY 30, 1902.
NO MODEL. 4 SHEETS—SHEET 4.
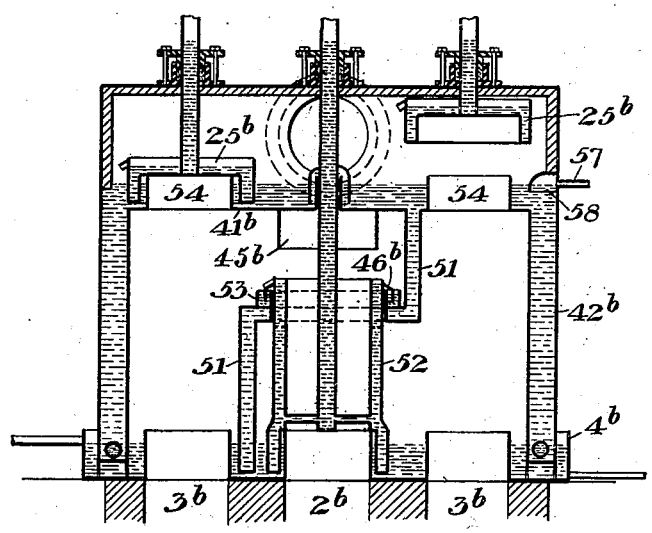
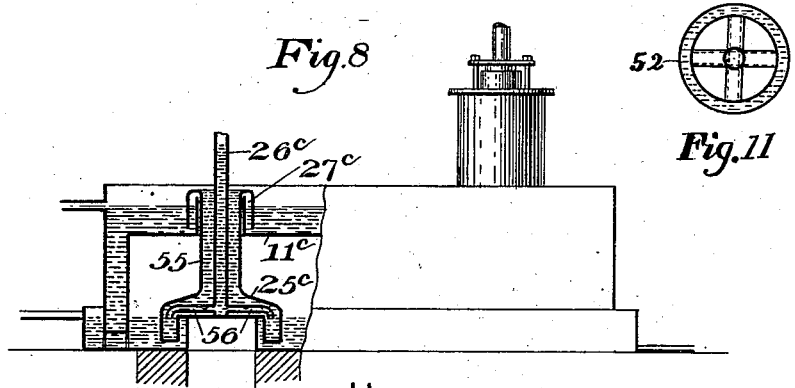
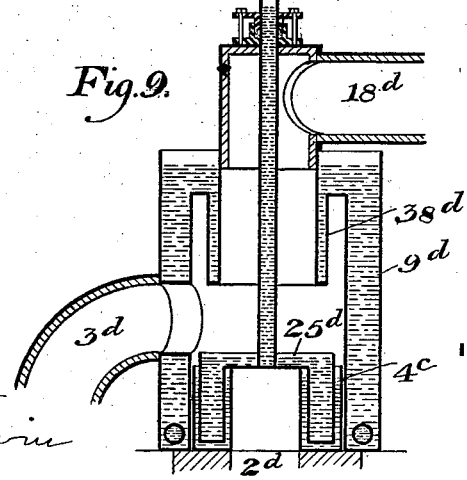
WITNESSES
INVENTOR

UNITED STATES PATENT OFFICE.

CLARENCE P. BYRNES, OF PITTSBURG, PENNSYLVANIA.

WATER-COOLED VALVE.

SPECIFICATION forming part of Letters Patent No. 723,582, dated March 24, 1903.

Application filed July 30, 1902. Serial No. 117,616. (No model.)

*To all whom it may concern:*

Be it known that I, CLARENCE P. BYRNES, of Pittsburg, Allegheny county, Pennsylvania, have invented a new and useful Water-Cooled Valve, of which the following is a full, clear, and exact description, reference being had to the accompanying drawings, forming part of this specification, in which—

Figure 1:
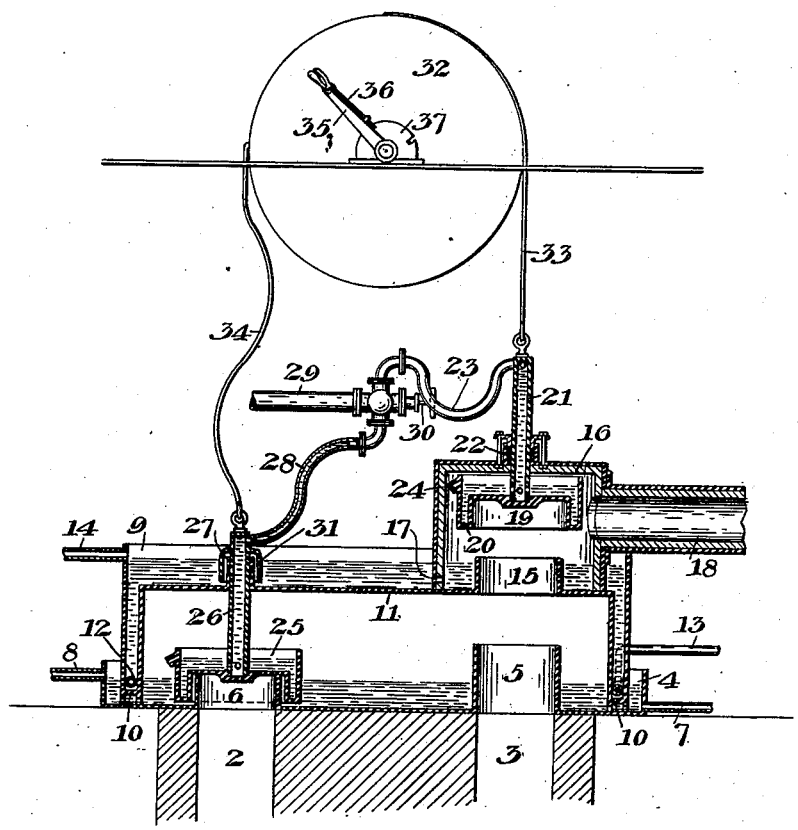
Figure 6:
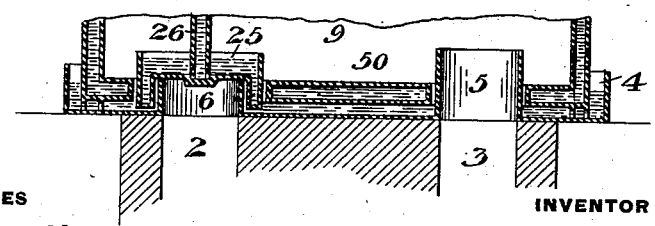
Figure 2:
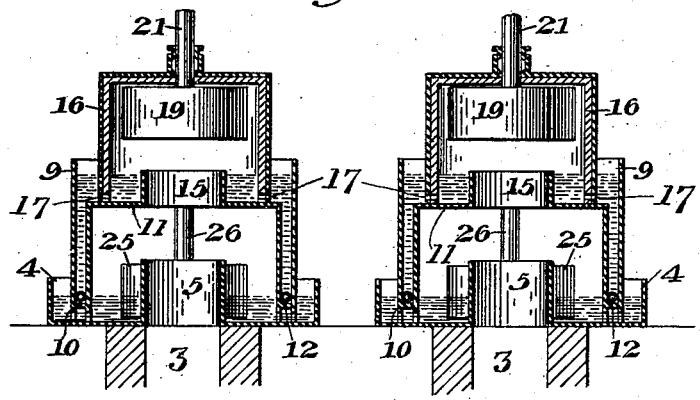
Figure 3:
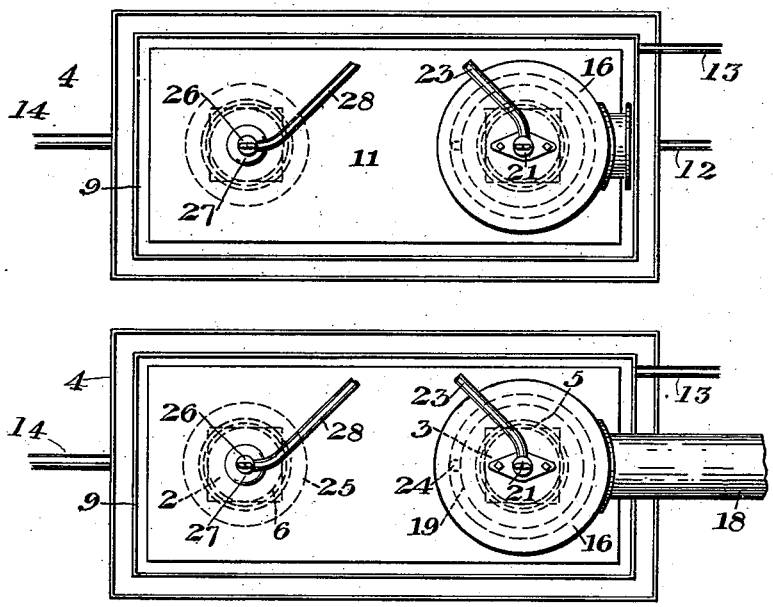

Figure 1 is a sectional side elevation showing a two-flue regenerative valve system arranged in accordance with my invention. Fig. 2 is a sectional end elevation showing two of the valves arranged side by side. Fig. 3 is a top plan view of Fig. 2. Fig. 4 is a view similar to Fig. 1, showing a modified form. Fig. 5 is a longitudinal vertical section showing the valve system as applied to a three-flue regenerative system. Fig. 6 is a partial sectional detail showing a modification of the water-cooled box. Fig. 7 is a longitudinal section showing another form of the three-flue system. Fig. 8 is a sectional side elevation showing another form of valve for the two-flue system. Fig. 9 is a longitudinal section showing a further two-flue form. Fig. 10 is a horizontal cross-section of the valve of Fig. 5, and Fig. 11 is a similar section showing the valve of Fig. 7.

My invention relates to the class of water-cooled valves, and more particularly to the reversing-valves employed in connection with regenerative furnaces, though it may be used for other purposes; and its object is to obtain a simple and cheap construction which will be long lived and in which the parts are prevented from warping and burning out by an efficient water-cooling system for those metal parts which are subject to the action of heated gases.

In the drawings, referring to the form of Figs. 1, 2, and 3, 2 represents a stack-flue, and 3 the flue leading to a gas-regenerator. 4 is a shallow water tank or trough, which is placed over these flues and is provided with flanged ports 5 and 6, extending upwardly through it to a level above the normal water-level therein. This tank is provided with an inlet-pipe 7 and an overflow-pipe 8 at opposite ends to maintain a circulation of cooling fluid therein. Within the tank 4 is set a water-jacketed hollow box or tank 9, having hollow side and end walls, as shown, with closed bottoms forming legs 10, which rest within the tank. The box is shown as supported by bottom projections resting on the tank-bottom. This box entirely surrounds the ports 5 and 6, and water is maintained in the box at such a level as to cover its inner top 11. This water may be supplied through a perforated pipe 12, extending around the box in the lower portion of its jacketed sides, and supplied from a pipe 13, and the box is provided with a suitable overflow 14 to maintain a constant water-level therein. The box in its top is provided with a flanged port 15, extending above the water-level and opening into a gas-box 16. This gas-box rests upon the top 11 of box 9 and has lower perforations 17 below the water-level to allow the water in the box to rest around the flanged port 15. Gas is supplied to this box through a suitable pipe 18, and its flow through the port 15 is controlled by a water-cooled valve consisting of a water-containing bucket 19, which is recessed upwardly in the central portion to provide a depending hollow water-cooled ring portion 20. This valve may be raised and lowered by a hollow stem 21, which extends upwardly through suitable metallic packing 22 in the top of the gas-box and is connected with a water-supply pipe 23. The stem is perforated in its lower portion to supply water to the water-cooled valve, the water overflowing through a suitable spout 24 into the water in the cover-box. The port 6 is controlled by a valve 25, similar to the valve 19 and having a hollow stem 26, which extends upwardly through a circular flange or collar 27, projecting upwardly from the top 11. 28 is the water-supply for this stem, the flexible pipes 23 and 28 leading from a water-supply pipe 29, having suitable control-valve 30. The stem 26 is preferably provided with a depending bell or ring 31 in its upper portion, which when the valve 25 is seated will enter the water over the cover 11 and seal the stem. The valves 19 and 25 may be operated in any suitable manner; but I prefer to provide connections which are arranged so that the port 6 will be unsealed and opened after the valve 19 has sealed the port 15, thus cutting off the gas before the stack-flue is opened, and so that on the reverse movement the stack-flue will be closed before the gas-valve is opened and that after the stack-valve is closed the gas-valve may be lifted to any desired amount to regulate the entering volume of gas. I have shown for this purpose a drum 32, having flexible connections 33 and 34 with the valve-stems. These flexible connections are so arranged that in the counter-clockwise movement of the drum the stack-valve will be lowered to its seat before the gas-valve is unsealed, and a further movement of the drum then slacks away on the cord 34, the cord 33 lifting the gas-valve to any desired amount. This movement may be obtained by a lever-handle 35, having a spring-catch 36 entering recesses in a segment-plate 37. It will be understood that the valves may be moved by any desirable connections, that a separate regulating-valve may be used in the gas-flue, and that the valves 19 and 25 may be connected to a two-armed lever, so that one will counterbalance the other in their movements. The air-regenerator valves may be arranged in the same manner as that shown, except that the gas-box is not used, and a plain cover-valve may be used to control the air entering the port through the cover 11. The two gas-valves for the furnace may be connected so as to counterweight each other, and the s'ack-valves may be similarly connected and counterbalanced.

Instead of placing the gas-valve 19 above the cover 11 a gas-valve may be used within the box. Thus in Fig. 4 I show a form similar to that of Fig. 1, except that the gas-valve 19' consists of a shallow bucket or tank within the water-cooled box, which is arranged to be sealed in its upper position by a depending water-cooled annular leg or ring 38 in the cover 11'. The gas-box 16' in this case becomes a vertical flue, which leads downwardly and forms an inner extension of the water-sealing ring 38. In this case the cover portion 11' will be sufficiently elevated above the ports to allow the gas to enter the box when the valve 19' is lowered and to flow around the valve and downwardly into the port 3'.

The system may be applied to the ordinary three-flue regenerative valve system where two regenerator-flues are placed on either side of a stack-flue. Thus in Fig. 5 I show an intermediate stack-flue 2ª, with gas-regenerator flues 3ª on either side thereof. In this form 5ª are the gas-ports, leading upwardly through the water-cooled box 4ª, and 6ª is the stack-port. In this form each valve consists of a hollow cylindrical water-jacketed casing 39, having an offset portion 40 of annular form at the bottom which rests upon the gas-port and seals it by means of the depending water-cooled portion. The jacketed cylinder extends upwardly through the cover 41 of the inclosing water-jacketed box 42 and extends into a gas-chamber 43, provided on the top of the box 42. Each of the valves extends upwardly within an annular flange 44, which extends above the water-level over the cover 41, and a depending sealing-ring 45 is provided which enters the open hollow annular chamber of the valve to seal its upper end when the valve is raised. When the valve is lowered, an annular depending bell or ring 46 enters the water over the cover 41 and seals the gas-chamber from the lower chamber. The stem 47 of each valve is a hollow water-conducting tube connected by branch tubular supports 47' with the annular jacket of the valve. Water is thus supplied to each valve and overflows at its top through a spout 48 into the water in the cooled cover-box. The gas enters the upper box through the port marked 49. The valves in this form will be operated in the ordinary way, one being raised as the other is lowered. In the position shown gas enters through the left-hand valve and passes down through the valve into the gas-regenerator. At the same time the waste gases rise through the right-hand port and pass to the stack-flue 2ª. In this case again I prefer to so arrange the valve connections that the valve being lowered will be sealed at its lower end before its upper end is unsealed to admit the gas. This may be done by suitably proportioning the depth of the sealing-ring 45 to that of the depending leg 40 of the valve.

In the above forms the gases are allowed to contact with the water in the lower tank. If it is desired to reduce the surface of water exposed to gases, the jacketed box 9 may be provided with a double bottom having circular holes arranged to extend around the ports 5 and 6, one or both of these holes being large enough to admit the valve 25 to the water seal or trough. Thus in Fig. 6 I show the box 9 as having a double bottom 50, connecting with the sides and having holes for the ports 5 and 6, one of these holes being large enough to allow the valve 25 to pass down through it into the water in the tank 4.

In Fig. 7 I show another form of valve system applied to a three-port arrangement. In this case the water-jacketed box 42ᵇ is provided with a partition 51, which is hollow and connects with the top and sides of the box to allow the water to circulate within it. This partition extends down into the water in the tank 4ᵇ and is provided with an intermediate horizontally-extending portion containing a hole through which the single valve 52 slides vertically. This valve is of the same general form as that of Fig. 5, and its depending upper flange 46ᵇ enters an open annular water-trough 53 when the valve is in its lowered position, as shown. The trough 53 sets upon the horizontal portion of the partition around the hole of the valve. The top 41ᵇ of the box is provided with a depending annular sealing-flange 45ᵇ, which prevents gases passing through the valve when it is lifted. I have shown the gas-box as provided with two ports 54, leading down into the box through its upper cover, each of these ports being controlled by a water-cooled valve 25$^b$ of a form similar to that shown in Fig. 1. When the valve is in the position shown, the central stack-flue 2$^b$ is connected with the left-hand port 3$^b$ through the cylindrical valve, and the gases from the regenerator thus pass to the stack, while the entering gas passes down through the right-hand port 54 and the right-hand flue 2$^b$ through the other regenerator. When the valve is lifted to its upper position, the gas-valves are shifted to close the right-hand port and open the left-hand port 54, and the waste gases from the right-hand port 3$^b$ then flow directly through the casing to the central flue 2$^b$.

In Fig. 8 I show a form similar to that of Fig. 2, except that the body portion of the valve 25$^c$ is not open-topped, the sides of the depending sealing-flanges being continued upwardly to form an outer valve-stem 55, which extends up through the inner top 11$^c$ of the box. The central supply-stem 26$^c$ is used as before and may be provided with lower branch pipes 56, which lead out into the hollow lips to insure circulation therein. In this case the upper sealing-bell 27$^c$ is formed on the outer valve-stem 55, and the water in the hollow valve flows over this flange into the water covering the top of the box instead of into the lower tank.

In Fig. 9 I show a two-flue form, wherein the stack-flue 2$^d$ extends vertically within the lower part of the water-cooled box 9$^d$, while the regenerative flue 3$^d$ extends through a hole in the side of this box. In this case I have shown the tank 4$^c$ as being in the form of an annular trough surrounding the stack-flue, while the water-cooled box 19$^d$ has a closed annular bottom and fits neatly around the annular trough 4$^c$. The open-topped water-cooled valve 25$^d$ is sealed in its lower position in the tank 4$^c$, in which case the gas entering through the flue 18$^d$ flows through the box and the flue 3$^d$ to the regenerator. The box is provided with a depending annular water-leg 38$^d$, which enters the annular leg of the valve when it is lifted, thus preventing gas from entering the box while the gases from the regenerator rise through the flue 3$^d$ and descend to the stack through the flue 2$^d$.

In the form of Figs. 5 and 7 the overflow-pipe 57 for the top of the water-cooled box may be sealed off from the gases by a flange or pocket 58.

The advantages of my invention result from the simplicity of the system and the complete system of water-cooling the valve and casing. Warping or cracking of the metal is avoided and leakage prevented. The system also provides for the regulating of the gas or air and for the closing of the stack valve or valves before the gas-valve is opened. The valves may be easily counterbalanced by connections to a lever or drum system or to separate counterweights, thus making them easy to operate.

The valve may be employed for other purposes than in connection with regenerative furnaces, and the construction may be varied widely, both as to the form of the valve proper, its casing, the water-cooling system and connections, and the mechanism for operating the valve or valves, without departing from my invention.

I claim—

1. A water-cooled casing having a port, a water-cooled valve controlling the port, and a coacting water-trough and flange, one of which is carried by the valve, said valve having mechanism for moving it to open and close the port; substantially as described.

2. A casing provided with water-cooled sides and top, and having ports, a water-cooled valve therein controlling at least one of said ports, a coacting water-trough and flange, one of which is carried by the valve, and mechanism for moving the valve to open and close its ports; substantially as described.

3. A hollow water-cooled box covering a vertical port, a water-trough surrounding the port, a water-cooled valve within the box having a portion arranged to dip in the trough, and mechanism for moving the valve vertically within the box; substantially as described.

4. A water-cooled casing having a port extending through it, a water-cooled valve within the casing having a stem extending through the casing, and a coacting water-trough and flange, one of which is carried by the valve; substantially as described.

5. In a regenerative valve system, a water-cooled casing having at least three ports, a vertically-movable water-cooled valve within the casing and arranged to seal at least one of said ports, and another valve arranged to control another of said ports; substantially as described.

6. In regenerative valve systems, a water-cooled box having stack and regenerator ports, and an inlet-port, a movable water-cooled valve within the casing controlling the stack-port, means for opening and closing the inlet-port, and mechanism for closing the stack-port valve before the inlet is opened; substantially as described.

7. A water-tank surrounding a vertical port, a water-cooled casing covering the port and sealed within the tank, and a vertically-movable water-cooled valve within the casing arranged to dip into the water in the tank; substantially as described.

8. A water seal surrounding a vertical port, an inclosing water-cooled casing, and a vertically-movable water-cooled valve having a hollow stem connected with a water-supply and arranged to dip in the water seal when in closed position; substantially as described.

9. In a regenerative valve system, a plurality of vertical ports, a water-cooled casing inclosing them and having a gas-inlet port extending through it, and a water-cooled valve arranged to control one of said ports and connect or disconnect it with the gas-supply; substantially as described.

10. A casing having an outlet-port and provided with sides and a top arranged to contain a pool of water, a water-cooled valve controlling the outlet-port, a port extending through the top of the casing, and a valve controlling said port; substantially as described.

11. A stationary box having hollow sides and arranged to contain water in its sides, said box covering a plurality of vertical ports and having valve mechanism controlling at least one of the ports; substantially as described.

12. A stationary box having hollow water-cooled sides, and a water-cooled top, said box having a plurality of ports, a valve within the box controlling at least one of the ports, said box having a water-sealed port in its top, and means for closing said upper port; substantially as described.

13. A water-cooled box or casing having hollow sides and covering a port, a water-trough around the port, and a vertically-movable valve within the box, said valve being water-cooled and having a depending water-cooled flange arranged to dip in the water-trough; substantially as described.

14. In a regenerative valve system, a water-cooled box having hollow sides and provided with a stack-port and a regenerator-port entering its lower portion, a water seal surrounding one of said ports, a valve within the box having a water-cooled body and arranged to dip into the water seal, said box having an upper inlet-port and means for opening and closing the same; substantially as described.

15. In a regenerative valve system, a movable valve or valves controlling the gaseous inlet-port, and also communication between the stack-port and the regenerator-port, and mechanical connections arranged to move the valve or valves to close the connection to the stack and thereafter open the gaseous supply-port; substantially as described.

16. A water-cooled box or casing covering a vertical port, a vertically-movable water-cooled valve arranged to seat on and close the port, and having a supply-pipe and overflow, and an open trough arranged to receive and seal the valve; substantially as described.

17. A water-trough surrounding a port, a water-cooled casing covering the port, a vertically-movable water-cooled valve arranged to be sealed in the trough and having an overflow, and connections for supplying water to the valve in its different positions; substantially as described.

18. In a regenerative valve system, a water-trough surrounding the port, a valve sealing therein, a water-cooled box covering said port, and another port, one of the ports being connected to the stack, an inlet-port leading into the upper part of the box, means for controlling the said inlet-port, and mechanical connections arranged to close the stack-port and thereafter open the inlet-port; substantially as described.

19. A water-cooled box having water-cooled sides and top, and provided with a pluraility of ports in its lower portion, at least one of said ports having a surrounding water-trough, a vertically-movable water-cooled valve having a depending water-cooled flange portion arranged to dip into the trough, said valve having a hollow supply-stem and an overflow, a gaseous supply-port leading into the upper part of the box, and means for opening and closing said supply-port; substantially as described.

20. In a regenerative valve system, a stationary water-cooled box having hollow water-cooled sides, and covering the stack and regenerator ports, said box having a gaseous supply-port extending through it, and a valve system movable relatively to the box and arranged to control said ports; substantially as described.

21. In a regenerative valve system, a stationary box having a water-cooled top, and provided with stack and regenerator ports, said box having a gaseous inlet-port extending through it, and a valve system movable relatively to the box and arranged to control said ports; substantially as described.

22. In a regenerative valve system, a stationary water-cooled box, covering stack and regenerator ports, and having a gaseous inlet-port extending through it, a water-cooled vertically-movable valve controlling at least one of said ports, and mechanism for moving the valve; substantially as described.

23. In a regenerative valve system, a stationary hollow box arranged to hold a pool of water over its top and within its sides, said box having stack, regenerator and supply ports, and a valve system movable relatively to the box and arranged to control communication between said ports; substantially as described.

24. A hot-blast valve comprising a stationary water-cooled box covering a lower vertical port, a vertically-movable water-cooled valve arranged to control said port, an open trough surrounding the port and arranged to seal the valve, and mechanism for moving the valve in a vertical direction to open and close the port; substantially as described.

25. A hot-blast valve comprising a hollow box having double walls, and arranged to hold a pool of water over its top and within said walls, said box covering a lower vertical port and also having another port, a trough surrounding the vertical port, and a vertically-movable water-cooled valve controlling the vertical port and arranged to be sealed in the trough; substantially as described.

26. In a regenerative valve system, a stationary water-cooled box having stack, regenerator and inlet ports, and a movable valve system controlling said ports, said system being arranged to close the stack-port before the gaseous inlet-port is opened, and to open the stack-port after the inlet-port is closed; substantially as described.

27. In a regenerative valve system, a stationary box having stack, regenerator and gaseous inlet-ports, and a water-cooled valve or valves movable relatively to the box and arranged to control the ports, said valve or valves being arranged to close the stack-port before the gas-inlet port is opened; substantially as described.

28. A casing having a vertical port, a vertically-movable water-cooled valve coacting with the port, one of said parts having an annular vertically-extending water-cooled leg, and the other having an open tank to receive the leg and seal the port, and mechanism for moving the valve, substantially as described.

29. A water-cooled casing having a vertical port, a vertically-movable water-cooled valve coacting with the port, one of said parts having an annular vertically-extending water-cooled leg, and the other having an open water-tank to receive the leg and seal the port; substantially as described.

30. A casing having at least three ports, a movable water-cooled valve controlling communication between two of the ports, one of said parts (the valve and casing) having a surrounding vertically-extending water-cooled leg, and the other having a tank or trough to receive the leg, and mechanism for moving the valve; substantially as described.

31. A casing having an upper and a lower port, an upwardly-movable valve having a water-cooled body, one of said parts, (the valve and casing) having a surrounding vertically-extending sealing-flange and the other having a surrounding open trough to receive the flange, and mechanism for moving the valve; substantially as described.

In testimony whereof I have hereunto set my hand.

C. P. BYRNES.

Witnesses:
GEO. B. BLEMING,
H. M. CORWIN.